Patented Oct. 30, 1945

2,387,976

UNITED STATES PATENT OFFICE 2,387,976

METHOD OF FORMING CARBOXYLIC SUBSTITUTED AMINES

Frederick C. Bersworth, Verona, N. J., assignor to The Martin Dennis Company, Newark, N. J., a corporation of New Jersey No Drawing. Application May 1, 1943,
Serial No. 485,342

10 Claims. (Cl. 260—534)

This invention relates to chemistry and more particularly to organic chemistry and has for its object the provision of a method of producing carboxylic acid substituted aliphatic amines.

Another object is to provide a method of converting alpha amino acids into carboxylic acid substituted amines.

Still another object is to provide a method of converting glycine into a carboxylic acid substituted amine.

Other objects will be apparent as the invention hereinafter is more fully disclosed.

In accordance with these objects I have discovered that when the metal salt of an alpha amino acid is brought into reactive contact with an aliphatic mono or poly amine at an elevated temperature at which the said salt and amine are in a liquid phase, the alpha amino or imino nitrogen group of the acid is converted by the amino hydrogen of the amine to ammonia ($NH_3$) which is evolved and the carboxylic acid residue of the alpha amino acid becomes a substituent group in the amine forming therewith a metal salt of a carboxylic acid substituted amine.

This reaction may be most simply illustrated by the following equations:

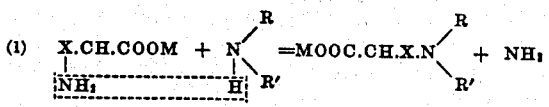

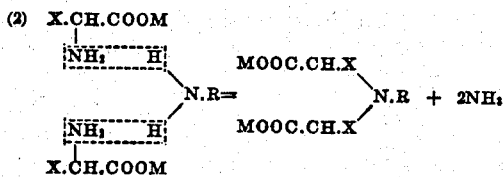

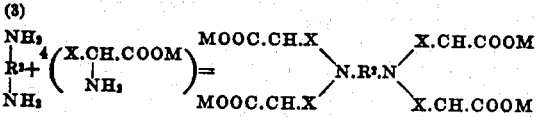

In the above equations R equals the remainder of an aliphatic amine containing at least one aliphatic carbon group attached directly to the amino nitrogen N; R' equals a group substituted for one amino hydrogen; X equals the remainder of an alpha amino acid attached to the alpha CH group; M equals a metal ion; and $R^2$ equals $(CH_2)_n$ wherein any of the hydrogens of the $CH_2$ groups not connected directly to an amino nitrogen may be displaced by a substituent group.

Interpreting the above equations; $R \cdot R' \cdot NH$ is the recognized formula for a secondary amine; $R \cdot NH_2$ is the recognized formula for a primary amine; $NH_2 \cdot R^2 \cdot NH_2$ is the recognized formula for a diamine; and

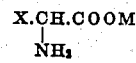

in the case of glycine, equals

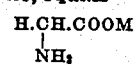

and in the case of alanine, equals

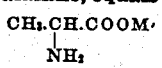

and in the case of leucine equals

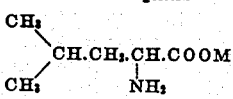

The discovery that the alpha amino nitrogen group of the alpha amino acids may be displaced by the amino hydrogens of an aliphatic amine, when the carboxyl group of the amino acid has been stabilized as a metal salt, to form carboxylic acid substituent groups in the amine opens up a wide field of organic synthesis reactions and provides a way of forming a large number of substituted amines that heretofore have not been obtainable.

The conditions under which this reaction may be conducted are relatively very simple. Most of the metal salts of the alpha amino acids are water soluble. The alkali metal salts particularly are highly soluble and are resistant to hydrolysis and to decomposition in aqueous solutions at elevated temperatures. I have discovered that by heating an aqueous solution of a water soluble metal salt of an alpha amino acid, preferably one containing from 20 to 50% of the said salt, to a temperature approximating the boiling point of the solution in a container sealed from the atmosphere or protected from the atmosphere by an inert gas such as nitrogen, in the presence of an aliphatic primary or secondary amine that contains at least one amino nitrogen group attached directly to an aliphatic carbon, which group contains at least one displaceable amino hydrogen, the amino hydrogen of the amine displaces the alpha amino nitrogen group of the alpha acid with evolution of ammonia and with resultant substitution of the carboxylic residue of the acid onto the amino nitrogen of the amine. In the case of a secondary amine, a mono substituted product is obtained; in the case of a primary amine either a mono or di-substituted product may be obtained depending upon the relative proportions of the amine and acid salt; and in the case of diamines and polyamines generally I may obtain a mono to poly substituted product depending upon the number of amino hydrogens available in the amine for such substitution, and the extent to which the substitution reaction is carried.

As one specific example of the present invention, but not as a limitation thereof, I will describe the same as it has been adapted in the formation of the substituted amines derived from glycine. As hereinabove disclosed glycine

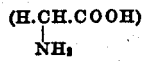

is the lowest or simplest member the homologous series of alpha amino acids and is also the most common of these acids. It is recognized chemically as being an amphoteric compound which in its pure or neutral state exists as an ammonium salt by interaction between the acid carboxyl group and the basic amino nitrogen group. When the carboxylic acid group is stabilized such as by reaction with a metal ion displacing the acid hydrogen therein to form a metal salt, such as an alkali metal (Na) salt, the amphoteric nature of the acid disappears and the salt in aqueous solution reacts as the compound

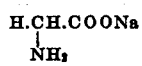

in which the alpha nitrogen group is displaceable.

In accordance with the present invention, a 30% aqueous solution of the alkali metal salt of glycine is placed in a container closed to the atmosphere, but provided with a refluxing condenser and with a one-way vent valve leading from the condenser to permit the escape under a positive pressure of uncondensed gases and vapors from the interior of the container to the exterior, and all residual air in the container is removed, as by flushing the container with an inert gas, such as nitrogen or ammonia.

The aliphatic amine in total amount providing one displaceable amino hydrogen for each alpha amino nitrogen group present in the salt, is added to the solution, and the solution is heated to a refluxing temperature. Heating of the solution at a refluxing temperature is continued until no further evolution of ammonia ($NH_3$) is obtained. The solution is then cooled to atmospheric temperatures and the substituted amine product is recovered from the solution in any convenient manner. In general, to recover the salt of the substituted amine, it is only necessary to remove the water, for example, by vacuum drying. Some of the substituted amines may be precipitated as acid compounds and washed free of the water solution of the metal salt. With others an acid salt of the substituted amine may be formed and the metal constituent of the amine precipitated from the solution. Other methods are available to obtain the separation of the carboxylic substituted amine from the aqueous solution in which it is formed.

In the specific example given, when a monoamine such as propylamine ($C_3H_7.NH_2$) is employed, the substituted amine product obtained with glycine has the formula:

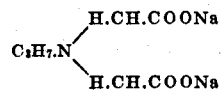

In the preparation of this di-substitution product one molecular weight of the amine is added to two molecular weights of the amino acid salt.

Dipropylamine $(C_3H_7)_2NH$, in the proportion of one molecular weight of the amine to one molecular weight of the amino acid salt, yields the mono-substituted compound:

$$(C_3H_7)_2 \cdot N \cdot CH_2 \cdot COONa$$

Ethylene diamine ($NH_2 \cdot CH_2 \cdot CH_2 \cdot NH_2$) in the proportion of one molecular weight diamine to from one to four molecular weights of the amino acid salt, yields the mono to tetra carboxylic acid substituted product, the latter compound of which conforms to the formula—

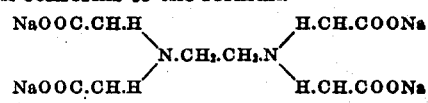

Other diamines wherein $R^2$ equals $(CH_2)_n$ in which $n$ equals the numeral 2 or more, such as tri methylene diamine to penta methylene diamine, yield an analogous series of carboxylic substituted amines.

By the substitution of the sodium salt of alanine or leucine for the sodium salt of glycine in the above specific examples, the corresponding carboxylic acid salt residues of these acids remaining after the removal of the alpha amino groups of these acids, are the substituent carboxylic acid groups in the compounds noted above.

All of the salts of the substituted amino acids obtainable by the practice of the present invention, as well as the acids and esters of said acids, have been found to have wide utility as extenders and plasticizers for natural and artificial rubber, imparting desirable properties to the vulcanized rubber compounds.

The esters of the said acids, particularly those in which the nitrogen is tertiary are the only known nitrogen-containing compounds compatible with the vinyl-type resins, such as Koroseal, vinyl-butyral resins, etc., acting as nitrogen-containing plasticizers and imparting new properties to the plasticized products.

They may also be used as intermediates in further organic synthesis; as de-ionization agents, wetting agents, leveling agents in dyeing, emulsifying agents, flotation agents, surface acting agents, and from them base-exchange resins may be produced.

As the length of the aliphatic carbon chain of the amine employed increases and as the length and complexity of the "X" structure of the alpha amino acid increases and also as the number of amino groups of the amine increases, carboxylic substituted amines of widely varying chemical and physical properties will be obtained. The alkali metal salts of these substituted amines are generally soluble in water, as are also a large number of other metal salts.

In the practice of this invention using amines that are insoluble in water or which at the temperature of heating are solids, I have found it advantageous to employ a non-reactive solvent such as a tertiary alcohol to promote miscibility and reactive contact in the solution.

An excess of the amine may also be employed to assist in maintaining a liquid phase reaction and where the amine is a gas at the temperature of reaction, it is preferable to feed the amine slowly to the reacting solution or to conduct the reaction in a closed system preventing the escape of the amine from the reaction zone.

In the practice of this invention in the forming of the poly carboxylic substituted amines, I have also found it advantageous to employ an excess of the metal oxide or hydroxide compound of the metal constituent of the amino acid salt, particularly where the metal constituent at the temperature of heating or at the dilution employed is highly ionizable, to suppress the formation of amine salts by reaction of the carboxyl group with the strongly basic amine and also to suppress amide formation by reaction of the carboxyl group with the ammonia ($NH_3$) as evolved.

For example, in the forming of the carboxylic substituted products of ethylene diamine, and of the tri-, tetra-, penta- (etc.) methylene diamines, I have found it advisable to employ a sufficient amount of caustic alkali to provide a pH approximating 9.5 in the aqueous solution of the sodium salt of glycine, in order to prevent and inhibit the formation of amine salts and amides.

It is believed apparent from the above disclosure of the present invention that the same may be widely varied without essential departure therefrom and all such modifications and adaptations are contemplated as may fall within the scope of the following claims.

What I claim is:

1. The method of producing carboxylic substituted amines which comprises heating an aqueous solution, containing a water soluble salt of an alpha amino acid and an aliphatic amine having at least one amino nitrogen group attached directly to an aliphatic carbon with said nitrogen group containing at least one displaceable amino hydrogen to a temperature approximating the boiling point of said solution under a refluxing condenser and under a positive pressure of uncondensible gases.

2. The method of claim 1, wherein the relative proportions of said salt and said aliphatic amine approximates that providing one displaceable amino hydrogen in the amine for each alpha amino group of the alpha amino acid.

3. The method of claim 1, wherein the said salt consists of an alkali metal salt.

4. The method of claim 1, wherein said alpha amino acid consists of one of the acids of the group consisting of glycine, alanine and leucine.

5. The method of claim 1, wherein said aliphatic amine consists of propylamine.

6. The method of claim 1, wherein said aliphatic amine consists of ethylene diamine.

7. The method of claim 1, wherein said aliphatic amine consists of a polyamine and wherein said salt consists of the alkali metal salt of said alpha amino acid and wherein the said solution contains an alkali metal hydroxide in an amount sufficient to provide a pH of about 9.5 in the solution.

8. The method of claim 1, wherein the said solution contains a proportion of a solvent for said amine.

9. The method of producing carboxylic substituted amines which comprises forming an aqueous solution containing an alkali metal salt of glycine and propylamine each in such relative amounts providing a displaceable amino hydrogen in the amine for each alpha amino nitrogen group in the said glycine salt and heating the said solution under a refluxing condenser and under a positive pressure of uncondensible gases to a temperature approximating the boiling point of the solution until ammonia evolution from the solution ceases, cooling the solution to atmospheric temperatures and separating the carboxylic substituted amine product from the solution.

10. The method of forming a carboxylic substituted polyamine which comprises forming an aqueous solution containing an alkali metal salt of glycine, ethylene diamine and an alkali metal hydroxide in the relative amounts providing four molecules of the salt for one molecule of the diamine and for a solution pH of about 9.5, and heating the solution under a refluxing condenser and under a positive pressure of an uncondensible inert gas to a temperature approximating the boiling point of said solution until ammonia evolution from the solution ceases, cooling the solution, and separating the carboxylic substituted amine product from the solution.

FREDERICK C. BERSWORTH.